United States Patent [19]

Hazra et al.

[11] Patent Number: 5,787,154
[45] Date of Patent: Jul. 28, 1998

[54] UNIVERSAL AUTHENTICATION DEVICE FOR USE OVER TELEPHONE LINES

[75] Inventors: Amitava Hazra, Holmdel; Joseph E. Wilkes, Red Bank, both of N.J.

[73] Assignee: AT&T Corp, Middletown, N.J.

[21] Appl. No.: 678,908

[22] Filed: Jul. 12, 1996

[51] Int. Cl.$^6$ .................................................. H04M 11/00
[52] U.S. Cl. .................................. 379/93.03; 379/91.01; 379/447; 379/144; 380/23; 235/382; 340/825.34
[58] Field of Search ................... 379/91.01, 91.02, 379/93.02, 93.03, 93.04, 93.05, 93.08, 93.15, 93.37, 355, 356, 357, 144; 380/23, 28, 25; 340/825.34, 825.31, 825.32, 825.33; 235/379, 380, 382

[56] References Cited

U.S. PATENT DOCUMENTS

5,406,619  4/1995  Akhteruzzaman et al. ......... 379/93.02
5,455,861  10/1995  Faucher et al. ..................... 379/93.02

Primary Examiner—Stella Woo

[57] ABSTRACT

A method is provided for securely transmitting information from a telephone to a calling party over a telephone network. In accordance with the method, encrypted audio signals are received from the telephone over a communication path to an authentication mechanism that may be located in the telephone network. The communication path is then disabled by placing the telephone is a hold state. The encrypted audio signals are decrypted to yield decrypted audio signals. The decrypted audio signals are transmitted to the calling party while the communication path is disabled. Finally, a communication path is enabled from the telephone to the calling party subsequent to transmitting the decrypted audio signals. This method provides a high degree of security since the communication path between the user and the authentication mechanism is disabled when the decrypted message is transmitted to the called party. Accordingly, if a party were to intercept the communication path between the user and the authentication mechanism (such as a listener using a receiver to intercept a wireless telephone transmission), the party could not intercept the decrypted message.

8 Claims, 5 Drawing Sheets

UNIVERSAL AUTHENTICATION DEVICE FOR USE OVER TELEPHONE LINES

TECHNICAL FIELD

This invention relates to authentication arrangements for telecommunications systems users.

BACKGROUND OF THE INVENTION

Telephone calling card fraud and fraudulent use of corporate PBXs currently costs consumers over a billion dollars a year. In a typical arrangement, callers to the PBX use an 800 number to get access to the PBX. Their authenticity is verified by asking them to dial a multi-digit digit access code, which, if authentic, gives these people access via the PBX to a second dial tone. The caller can then place any outgoing call not denied to normal users within the PBX. Clearly, anyone who can obtain the 800 number and the access code can then place calls that are charged to the PBX. More generally, the present calling card arrangements are also subject to extensive fraud through the use of stolen cards or through the interception by audio taps or visual observation of a calling card number. Computer "hackers" are particularly active in using their computers to access corporate PBXs and determine valid access codes by trial and error. They then sell these codes along with the PBX telephone numbers to "resellers" who resell these to numerous fraudulent users. This vastly magnifies the scope of the fraud. Similar problems arise when a caller transmits private information such as a credit card or social security number. Private information can be readily intercepted in the same manner in which access codes are fraudulently obtained.

U.S. Pat. No. 5,406,619 relates to a universal authentication (UA) device that can be used over any phone line to authenticate the use of calling cards, private corporate PBXs etc. The authentication device provides unique signals that authenticate its user. The authentication device is used in lieu of a calling card and is equipped with hardware to allow a query-response type of authentication scheme to be used or to provide the data of a query and the response to that data. In any case, the authentication message (response) sent by the device will be different for successive authentication requests. The UA includes an audio interface (tone generation and reception) which allows the device to communicate directly with the telephone using tone signals and frees the user from manual keying in of codes. However, since the authentication message sent by the UA device is in an encrypted format, the technique disclosed in this patent cannot be used to transmit private information to a called party, unless, of course, the called party can decrypt the message. Thus, a problem exists in that there is no inexpensive and convenient arrangement for permitting users of ordinary telephone lines or wireless systems to transmit private information with a relatively high degree of security and which does not require decryption by the called party.

SUMMARY OF THE INVENTION

The present invention provides a method for securely transmitting information from a telephone to a calling party over a telephone network. In accordance with the method, encrypted audio signals are received from the telephone over a communication path to an authentication mechanism that may be located in the telephone network. The communication path is then disabled by placing the telephone is a hold state. The encrypted audio signals are decrypted to yield decrypted audio signals. The decrypted audio signals are transmitted to the calling party while the communication path is disabled. Finally, a communication path is enabled from the telephone to the calling party subsequent to transmitting the decrypted audio signals. This method provides a high degree of security since the communication path between the user and the authentication mechanism is disabled when the decrypted message is transmitted to the called party. Accordingly, if a party were to intercept the communication path between the user and the authentication mechanism (such as a listener using a receiver to intercept a wireless telephone transmission), the party could not intercept the decrypted message.

DETAILED DESCRIPTION

A Universal Authenticator (UA) is a card-sized device that is equipped with computational hardware to implement a function mapping queries into responses, a keypad to enter input, an LCD display and an audio interface which can receive input and provide output in the form of tones transmittable via a telephone handset over a customer line to a switching system. The object of implementing a function mapping queries (a first number) into responses (part of a second number) is to create time varying responses, based on time varying queries, so that an interception of one query-response couple will not be useful at a later time. It also has the magnetic bar information currently on calling cards so that it can also be used at the special stations already provided for calling cards as well as from any other phone. Two different devices provided to two different users picked at random, will almost certainly use different functions to generate responses. It should be noted that the device is significantly different from the AT&T SMART CARD Registered TM and other smart cards which can only be used from special stations. (This is discussed in detail later). Time varying authentication messages may be produced by three different methods. The first method is to use a challenge-response scheme-that is, to let the system at the far end provide a random number to the authentication device, which then computes an appropriate response and transmits it back to the system. The other method is to use the Time of Day as input to a function, and transmit the output of the function as well as the Time of Day used, to the system at the far end. The third method is to use a monotonically increasing or decreasing function, such as a count which is incremented with each use. The first method is described in detail in the following paragraphs. The second and third methods are briefly described later.

USE OF UNIVERSAL AUTHENTICATOR

Figure 1:
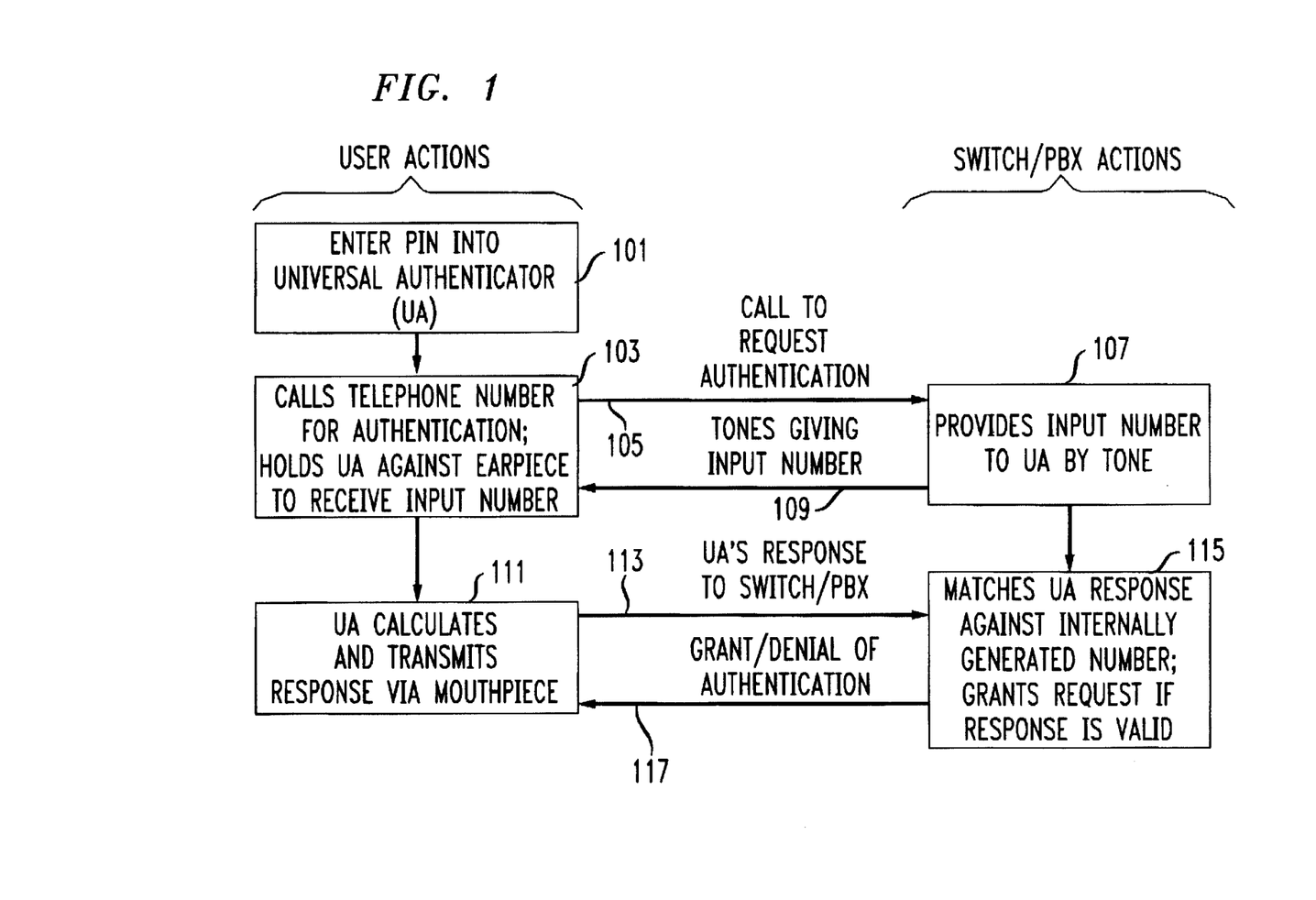
FIG. 1 is a block diagram of one scenario for authentication in accordance with the present invention.

A procedure for using this device for corporate PBX authentication is as follows. Each legitimate user is assigned a Personal Identification Number (PIN) which is also associated with the particular UA provided to him or her. Before seeking authentication the user enters his/her PIN into the UA to activate it. The UA will only be activated and ready for use if the PIN is correct. Next, the user dials a phone number (printed on the UA if desirable) to seek authentication (as done currently with corporate PBXs). A voiced response directs the user to place the activated UA close to the earpiece of the calling telephone station and enable it to receive incoming tones from the earpiece. The authentication system then sends a set of tones representing a random number which is received by the audio interface of the UA. This is the query number. The UA then produces an output number as an appropriate response to the query number and flashes a message to the user to place the UA on the mouthpiece and hit the key to start transmission. The UA sends the set of tones representing the output that it has produced. The system matches the response against an output that it generates internally, and authenticates the request if there is a match. The overall scenario of operation is shown in FIG. 1.

The user has the option, the only option available in some presently available authentication devices, of manually keying in the number to the UA and dialing the response back to the system manually. In this case a voiced response from the system provides the user with a random number to enter into the UA. Once this is keyed into the UA by the user, the UA produces a corresponding output number on its display. This is entered by the user (using a telephone dual tone multi-frequency (DTMF) keyboard if provided or using voice if a speech-recognizing system is supported) to seek authentication. Alternatively, and preferably, the user may request the UA to transmit the tones representing the output number.

APPEARANCE AND INTERNALS

Figure 5:
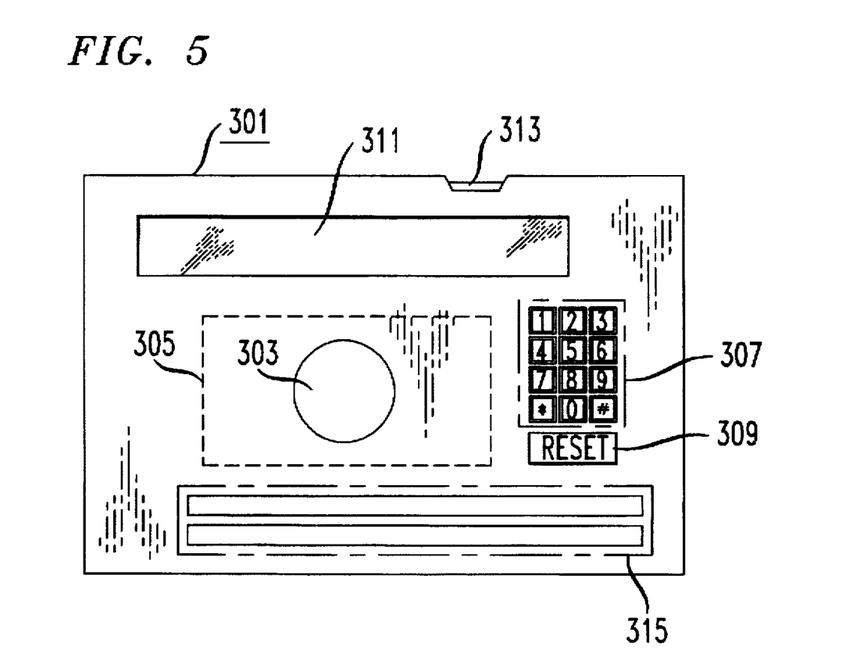
FIG. 5 shows the external appearance of one embodiment of the UA.

FIG. 5 shows the external appearance of the UA. The external appearance of the device is similar to a smart card except that it has an audio interface to allow it to communicate using an ordinary telephone station. The keypad allows entry of the PIN or manual entry of the input random number (if the user so chooses). The LCD displays the number entered. After computation of the response, the response number is also displayed. The LED flashes to indicate that computation is complete. The key in the notch on the edge is for enabling the audio reception/transmission and is convenient when the user has to hold the UA flat against the earpiece or mouthpiece.

A magnetic bar code on the device allows it to be used from a calling card reader station as well. In this case, only the encoded identification is transmitted, so that authentication is much less secure.

Figure 2:
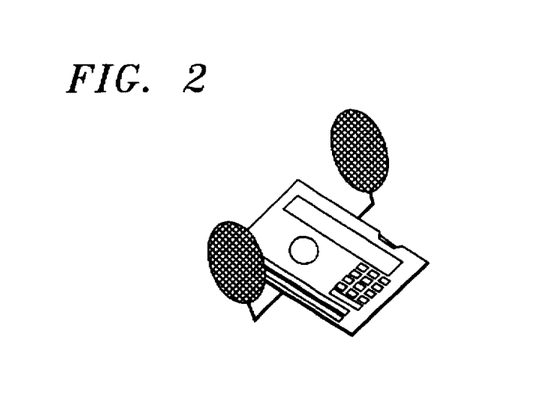
FIG. 2 shows one embodiment of the UA constructed in accordance with the present invention that can be easily mounted to and removed from a cellular telephone.
Figure 3:
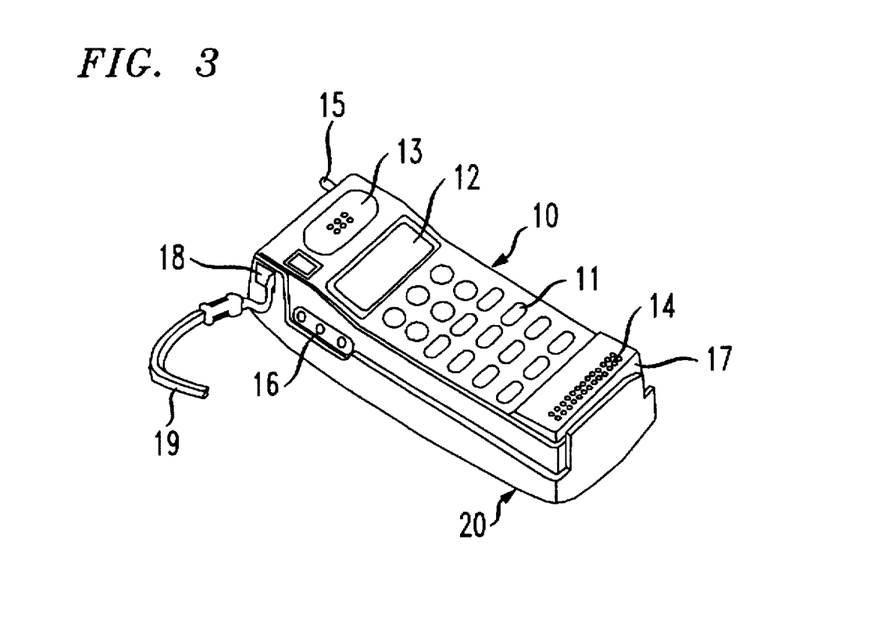
FIG. 3 shows a perspective view of an exemplary portable cellular telephone to which the UA shown in FIG. 2 may be mounted.

FIG. 2 shows one embodiment of the UA that can be easily mounted to and removed from a cellular telephone so that the caller does not need to physically handle the device during initiation of a call. This feature may be advantageously employed in cellular telephones located in automobiles, for example, where the caller may have particular difficulty in placing the UA against the earpiece and where for security reasons it is desirable to remove the UA from the cellular telephone when not in use. FIG. 3 shows a perspective view of an exemplary portable cellular telephone to which the UA shown in FIG. 2 may be mounted. The telephone has a front operational face with a push button area 11 and display screen 12 disposed between an earpiece 13 and mouthpiece 14. The telephone has a smooth back face (not shown), an upper end wall 23 from which a collapsible antenna 15 extends, a pair of opposed side walls 24 and 25 with a bank of connector holes 16 formed in one such wall, and a bottom end wall containing a jack recess (not shown).

Figure 4:
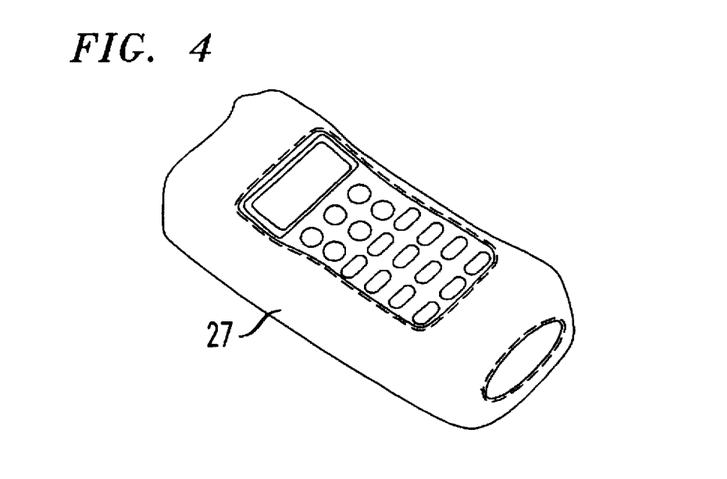
FIG. 4 shows the UA and telephone positioned inside a sleeve.

In accordance with the embodiment of the present invention shown in FIG. 2, a pair of speakers is disposed lateral to the plane of the UA so that when the UA is placed adjacent to the back face of the cellular telephone, the speakers will be situated along the side walls 24 and 25 of the telephone in proximity to the earpiece 13. The UA may be conveniently coupled to the telephone with a sleeve fabricated from elastic material. The UA, with its speakers, are positioned inside the sleeve and the telephone is then inserted through the sleeve, as shown in FIG. 4. The sleeve 27 may have one or more cut-outs to expose the display 12, push button area 11, earpiece 13 and mouthpiece 14. The elastic material forming the sleeve is sufficiently flexible to fit around a wide variety of cellular telephone configurations. The sleeve is configured so that it does not interfere with either the antenna 15 or the recharging process. The position of the sleeve along the length of the telephone may be varied to properly accommodate the features of any particular telephone design.

Figure 7:
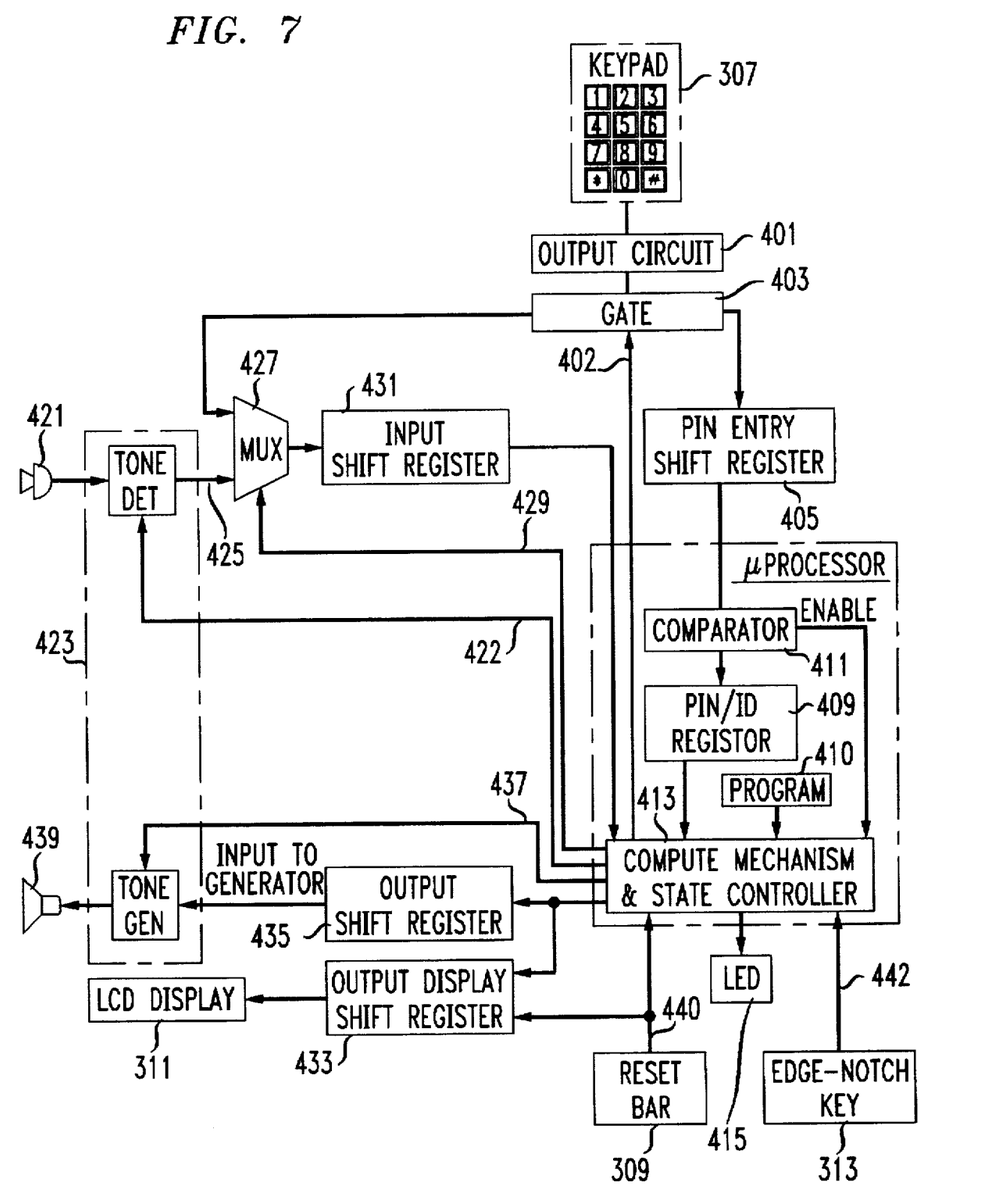
FIG. 7 shows the internals of the UA.

The design of the UA shown in FIG. 2 may be modified as appropriate to accommodate the requirements of cellular telephones. For example, the UA may be provided with a sliding, spring-loaded activation switch instead of a push-button switch to minimize the likelihood of accidental activation. In operation, the UA may advantageously employ a simple authentication procedure such as by employing a monotonically increasing or decreasing function. For example, in one simple authentication procedure, which is discussed below, the UA counts the total number of previous authentications and the authentication system only accepts the authentication if the count transmitted by the UA exceeds the last authenticated count. The use of this authentication procedure eliminates the need to enter numbers into the UA and hence no keyboard is needed. The internals of the device are shown in FIG. 7. Entry from the keypad is done either when entering the PIN or if manual mode of entering the input number is chosen. Depending on the operation, the entry from the keypad is gated to either a PIN entry register or a MUX. The content of the PIN entry register is compared with the content of a stored PIN register and in case of a match, the compute/table lookup unit of the microprocessor (for generating the response) is enabled for subsequent operation. When the user enables the tone detection (by using the key in the notch) the received tones (from the receiver) are converted into bits which are sent to the MUX. The MUX allows the choice of automatic mode (through the audio interface) or manual mode (through the keypad) of input entry. The entry selected by the MUX is entered into the input shift register and subsequently provided to the compute/table lookup unit. On completion of response computation, the response is provided to both the output display register and the output shift register. The output display register allows the response output to be displayed in the LCD. The content of the output shift register is provided to the tone generator when the user enables it (by clicking the key in the edge notch a second time) and the tone generator converts the output to tones which are transmitted by the transmitter.

FIG. 1 is a block diagram of the scenario for authentication. The user enters a PIN into a universal authenticator (action block 101). This primes the universal authenticator for later use. The user then calls a telephone number for the authentication service and holds the UA against the earpiece of the telephone instrument to receive an input number, generally a random number generated by the authentication system. The call is set up (arrow 105) to the authentication system and the authentication system which is generally either a switching system (switch) or a PBX provides a random number to the UA by means of tone signals. These tone signals are transmitted to the UA (arrow 109) and are received via the earpiece of the handset of the telephone instrument. The UA then calculates the response and transmits a response via the mouthpiece of the subscriber handset. This response is transmitted to the authentication system (arrow 113) which matches the UA response against an internally generated number and grants the request if the response is valid (action block 115). The authentication system then transmits back to the user a grant or denial of the authentication (arrow 117) after which the user can make a telephone call or otherwise take advantage of the positive authentication. With the universal authenticator described herein, it is also possible to use keyboard entry into the UA instead of listening to tones and to inform the user of the random number through a voiced response from the authentication system. Similarly, it is also possible for the user to transmit a response to the authentication system by keying in the response using a dual tone multifrequency (DTMF) keypad of the user's telephone instrument. Further, in an alternative configuration, the UA itself supplies the input number. With this configuration, block 107 and arrow 109 are not used and the UA instead of receiving the input number generates the input number internally within block 103. The response in this case must include the input number to permit the authentication system to authenticate the "response" number from the same input number that was used by the UA.

FIG. 5 is a physical diagram of the universal authenticator 301. It includes an audio interface 303 comprising a microphone for receiving signals from a telephone connection and a speaker for transmitting signals to a telephone connection. The computing hardware 305 inside the UA is shown by a dashed line since it cannot be seen from the outside of the UA. The UA also has a keyboard 307 which has the 12 DTMF keys and a reset bar 309 for resetting the UA. Also shown are an LCD display 311 of numbers received or generated by the UA and a key 313 in a notch on the edge of the UA. A magnetic code bar 315 is also attached to the outside of the UA so that the UA can be read by conventional credit readers. Additional details concerning the internals of the UA and its operation may be found in U.S. Pat. No. 5,406,619.

Figure 6:
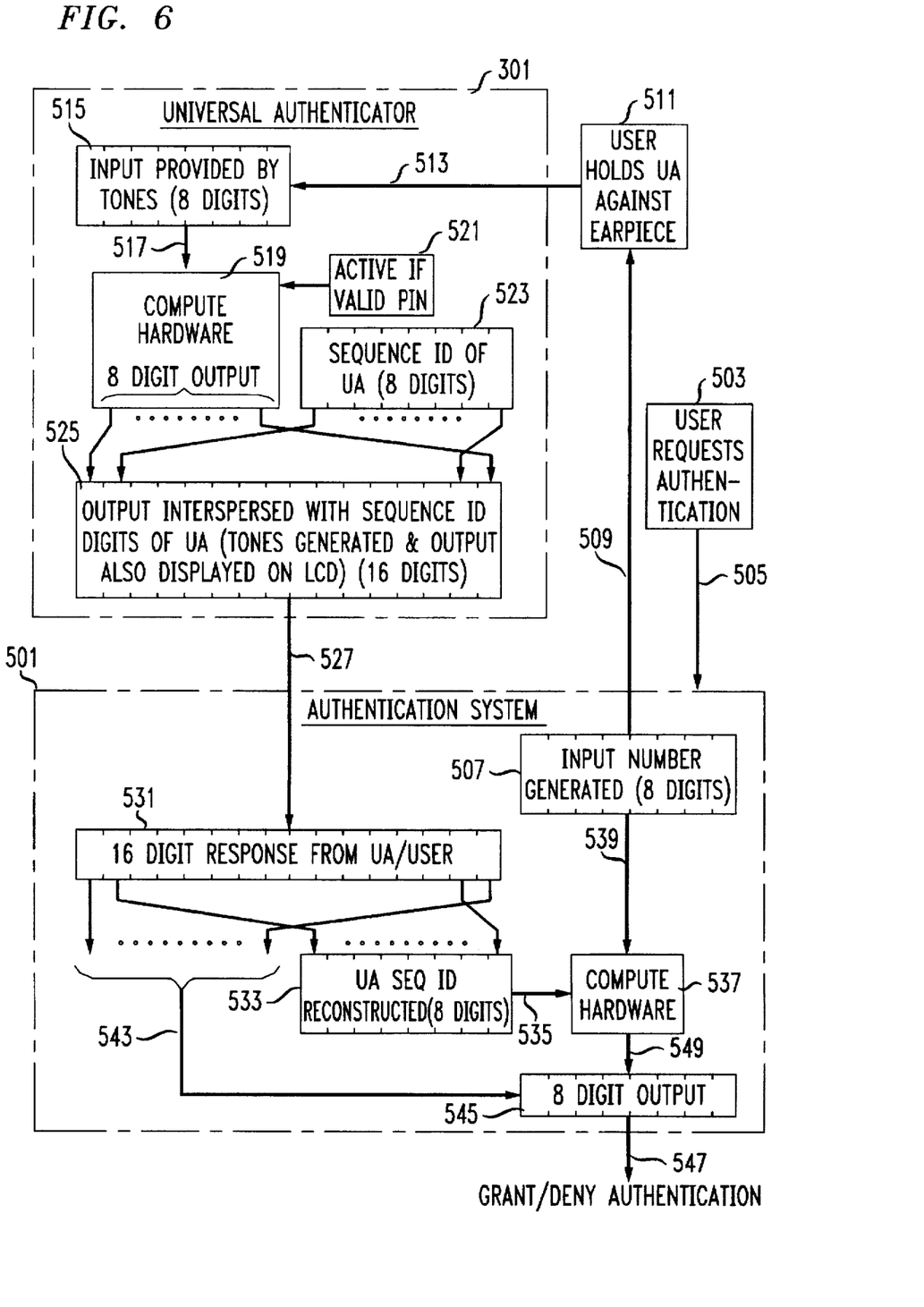
FIG. 6 is an overall block diagram of the operation of the universal authenticator.

FIG. 6 is an overall block diagram of the operation of the universal authenticator. The circled numbers represent successive steps and have been placed on the diagram to help the reader follow the progress of the process. The two main blocks in dashed lines are the universal authenticator 301 and the authentication system 501 which is likely to be a switching system or a PBX. The process starts when the user requests an authentication (action block 503) (It is assumed that the UA is already in the ready state because the user has previously entered a correct PIN.) The request for authentication is performed by dialing a number for a connection to authentication system 501. The completion of the action is represented by arrow 505. The authentication system generates an 8-digit input number (block 507) which number is then transmitted by tones to the UA (arrow 509). The UA receives these tones by being held against the earpiece of the handset from which the user requested the authentication (action block 511). The input number is then transmitted from the tone detector of the UA and is transmitted (arrow 513) to storage 515 for storing the digits representing the input number. (In an alternative arrangement, the input number can be keyed in by the user using keypad 307.) These 8 digits are then passed (arrow 517) to the compute hardware 519 which generates 8 digits of output. These 8 digits of output are combined with an 8-digit identification of the UA (in block 523) to form a 16-digit output consisting of the 8-digit output of the compute hardware and the 8-digit output of the sequence identification. These are stored in the 16 digits of block 525 and are transmitted (arrow 527) from the tone generator 423 via the speaker 439 over the telephone connection to the authentication system 501. They are received and stored in a 16-digit response register 531 which takes the 8-digit UA sequence identifier selected in block 533 and transmits (arrow 535) these digits to the compute hardware. The compute hardware then uses the input number and the UA sequence identifier to compute the 8 digits of output computed by compute hardware 519 of the UA. The computed output is transmitted (arrow 549) to an output register 545 where they are compared (arrow 543) with the 8 output digits received and stored in block 531. If there is a match then authentication is granted and if there is a mismatch authentication is denied. The grant/deny authentication signal 547 is transmitted back to the user and is used to allow the switching system or PBX to accept or reject further calls from that user.

SAFEGUARDS

It is well-known that the query-response method of authentication is superior to a single password or code. (See, for example, W. J. Caelli (ed.): Computer Security In The Age Of Information, pages 223–234, Elsevier Science Publishers, B. V., IFIP, 1989.) In the query-response mode the response (the output number) that is provided by the user is good only for the specific query (input number) presented by the system. An eavesdropper can gain nothing by illegal monitoring of the response because the query presented by the system will almost certainly be something different the next time and will require a completely different response. Typically, a complex function (or a large table, or a combination of function and table) to map queries to responses provides good protection against attempts to breach the security of the system.

The second safeguard is the use of the PIN (possibly 4 digits). This ensures that unless the PIN is known the UA is useless to a thief. Also, the user may preload the PIN in a secluded place (away from public phone booth for example). Finally, once the PIN is entered, the UA can only be used for a limited number of times (say 5) and for a limited amount of time. The PIN must be reentered after that to continue using the UA. This ensures that even if a UA loaded with the valid PIN is stolen, it can be used only a limited number of times. Also, if a user loads a PIN and forgets to use the UA subsequently, an automatic internal timer will erase the PIN after some time, making the UA useless for a thief. Of course, the user is expected to report loss of the UA immediately as with other credit cards, calling cards etc.

Finally, as with most authentication schemes, the authentication system will break the connection after a limited number of retries in case of errors. Thus if the system at the far end receives an incorrect response it will send a different input to allow the user to retry. After a limited number of retries the connection is broken. Reestablishing the connection will of course be delayed by the normal delay in the phone network.

IMPLEMENTATION

The implementation consists of two parts; the implementation of the query-response in software/hardware on the switch/PBX, and the implementation of the program on the UA to determine the output number given an input number. The part to be implemented on the switch, PBX or other telecommunications network element, consists of selection of the input random number, a DTMF output and/or voiced response system to relay the number to the user, reception of the response or digits keyed in by user, and matching of these against the system's own internally generated response. The generation of response can be packaged in a chip to avoid any probing. Within the UA there has to be a similar mechanism for generation of response. This mechanism can be an implementation of a computational algorithm or a table lookup process or a combination of both. The mechanism within the switch/PBX for generation of the matching response must also take into account the identity of the particular UA involved. Two different UAs will almost certainly use different functions for the query-response match. The UA reveals its identity by embedding digits specifying its id number within its output response. The switch/PBX will, with the help of this id, determine the appropriate function to use for checking the response given by the UA.

As indicated earlier the functions mapping queries to responses should be different for different UAs. This may be achieved easily within the UA by having a table mapping certain inputs to certain outputs. But, this has two serious drawbacks-first the set of inputs is limited thus somewhat compromising security, and secondly at the system end a very large amount of memory will be taken up storing the tables of the many UAs. A solution (from standard encipherment algorithms) is to use a common algorithm for the mapping, but modify the algorithm somewhat for each user by using a different key input for each user. Within the system the sequence id of the UA may be used as an entry into a table to find the key for that UA which can then be provided to the algorithm so that it is suitably modified for the particular UA and can calculate the proper response for the given input. Within the UA the details can be somewhat simpler. Only a specific version of the algorithm has to be implemented. This may be wholly or partially table-driven. FIG. 6 shows some details of the overall scheme involving the UA and of the query-response system on the switch or PBX (assuming the sizes of the initial query number and the UA sequence id to be both 8 digits long). (8 digits each for the query number and the sequence id will provide sufficient protection, and at the same time the total response size to be keyed in by user would be 16 digits. This is comparable to calling card codes currently being used (14 digits).

The UA is a sealed unit which will minimize damage due to moisture, etc. The batteries are sealed in. A low power indicator informs the user that the battery is about to die; the user then has the option of calling in for a replacement UA. Typically, the UA will be replaced every couple of years just like credit cards, calling cards etc. The battery power is adequate to last the anticipated life-time of the UA. A customer provided PIN will be "burnt" into a ROM in the UA before it is provided to the customer. The UA identity and key or other information necessary to control the generation of the response message are also "burnt" into the ROM of the UA. In one preferred implementation, the program is also "burnt" into the ROM, although, alternatively, it could be loaded into RAM after the battery is installed.

Different codes for different services can be used to set the UA to a specific mode of operation for authenticating the use of the desired service. The telephone number to request the authentication for using the specific service has to be called and the query-response process executed as earlier described. The implementation of the UA as well as the overall scheme is feasible with currently available technology.

The authentication service can be provided by telephone switches (such as AT&T's 5ESS Registered TM switch) as a feature. Corporate PBXs can be served by such a switch which will act as a gatekeeper. Once a caller's request to access a PBX is authenticated the caller will be granted access to the PBX by the gatekeeper switch and the PBX will service the caller's requests, so the PBX is not tied up performing repeated authentication for users requesting access. Also, once the system end of the authentication mechanism is available on the telephone network it will become easier to make the UA available for a variety of purposes. The telephone network owner (local telephone company or long distance provider) can then provide authentication as an end to end service-providing both UAs and the authentication service on the network. The UA is not a competitor of the smart card in this respect. While smart cards are usually more computationally powerful and versatile than the proposed UA, they are also more expensive and are restricted by their need for special stations to operate from.

The UA also may be used to transmit private information such as a credit card number. In operation, the user transmits the private information to the network switch/PBX serving as the gatekeeper. The private information is encrypted by the UA using any of the previously mentioned encryption techniques used to encrypt authentication messages. The network gatekeeper subsequently decrypts the private information and temporarily disables the communication path between the user and network by placing the user in a "hold" state in a well known manner. The decrypted information is then forwarded to the called party by the gatekeeper. Since the communication path between the user and the gatekeeper is disabled, a party that intercepts this communication path (such as a listener using a receiver to intercept a wireless telephone transmission) cannot intercept the decrypted message transmitted from the gatekeeper to the called party. That is, the transmission of information from the user to the called party is performed in two distinct steps that are isolated from one another so that both the encrypted and decrypted information cannot be intercepted by a single party receiving one step of the transmission. Once the decrypted information has been transmitted by the network, the communication path between the network and the user is re-established so that communication between the user and the called party can continue in the usual manner.

ALTERNATIVE IMPLEMENTATIONS

It is possible to have a somewhat more rugged and less expensive implementation by not using the standard tones used by DTMF, and instead encoding the audio signals using frequency shift keying with just two frequencies in the audio range (a "high" frequency and a "low" frequency). This is the scheme described, for example, in U.S. Pat. No. 4,823,956, used for incoming caller line identification. In that case the DTMF Tone detector/generator (SSI20C90) will not be needed. Also, instead of a carbon microphone it is possible to use other techniques to pick up the incoming audio. A detector based on an inductor coil (similar to those used in hearing aids) can pick up the electrical signal directly from the phone line (near the earpiece) bypassing the need for a microphone. This will work well in noisy environments. Similarly, instead of an ordinary metal diaphragm speaker, a piezo-electric sound generator can be used to generate the outgoing audio. Such piezo-electric devices are physically more rugged than metal diaphragms and are also more compact. They are also less expensive. Them is no need for high fidelity in the audio output because it is only necessary for the far end to determine whether the frequency is "high" or "low". So piezo-electric sound generators which are typically limited to a few frequencies may be quite acceptable. The authenticator device requires the user to execute two actions with the device in order to receive authentication. The user has to first click the receive/transmit key and hold the device against the earpiece to receive the incoming audio signal, and then click the key again and hold the device against the mouthpiece to transmit the outgoing audio signal. A modification to the scheme can reduce the number of user actions needed and make the device easier to use.

By adding a pseudo random signal generator (such as a Pseudo Noise sequence generator) and an internal clock, the device can be itself made to produce the input number. Then there is no need to receive incoming audio signals from the phone line. The user then, has to only hold the device against the mouthpiece and click the transmit key. The Time of Day available from the internal clock will be provided as the seed to the pseudo random signal generator, and the output of this generator will be the input number to the authenticator device. The device will transmit both its internal Time of Day (year, month, day, hour and minute) along with the output number from the computation/table look-up function.

The system at the far end receives the Time of Day from the device and first verifies that it is close (within a threshold) to its own internal Time of Day. If the device's Time of Day is not within the threshold, the far end system (PBX or switch) will ask that the device's clock be synchronized with the far end system's clock before authentication is requested. The check for the consistency of Time of Day is to be done to prevent an eavesdropper from recording a pair-Time of Day and output number-and reusing the pair to gain fraudulent authentication.

If the device's Time of Day is within the acceptable threshold the far end system uses the transmitted Time of Day to generate the input number for authentication, and subsequently the output number, and matches it against the output number received. In case of a match, authentication will be granted.

Another alternative, somewhat less safe, is to store a count in the UA, and advance the count with each use. The authentication system also keeps track of the count. The UA transmits both the count and the transformation of the count to the authentication system. The authentication system will then verify the transformation but will only accept the authentication if the transmitted count exceeds the last authenticated count. Advantageously, this arrangement prevents someone who has intercepted a legitimate authentication from simply reusing it, but avoids the necessity for receiving a random number from the authentication system. The term "random" or "pseudo-random" as used herein means that the number is unpredictable, and not that it meets the tests of random numbers such as those found in a random number table. Unpredictability is the key attribute.

We claim:

1. Authentication means comprising:
   means for automatically transmitting audio signals over a voice telephone line, said line connected via a telephone network to an authentication system, said means for transmitting arranged for transmitting by having a user of said authentication means hold said means for transmitting against a microphone of a telephone station while leaving a speaker of said telephone station available for said user of said authentication means to listen;

means for generating a number, independent of any keyed personal identification number, coupled to said means for transmitting, wherein said number is derived from a time-varying quantity and a key unique for said authentication means, and said quantity globally and independently maintained internally in said authentication means and in said authentication system; said number for transmission by said means for transmitting to said authentication system for authenticating an identity of said user of said authentication means; and said number comprising data for identifying said authentication means and comprising no data based on any keyed personal identification data;

means for storing a personal identification number;
   a keypad for entry of a personal identification number;
   means for enabling said authentication means in response to a match of the stored and entered personal identification numbers, wherein said authentication means is planar and essentially the size of a credit card and said means for transmitting includes a pair of opposing speakers situated in a plane lateral to a plane of the authentication means;

a sleeve formed from an elastic material in which said authentication means and said pair of speakers are insertable, said sleeve being configured to support said authentication means against a back face of a telephone when said sleeve is enclosed around said authentication means, said sleeve being further configured to allow operation of said telephone when enclosed around said authentication means.

2. The authentication means of claim 1 further comprising a control key, for operation by said user in response to prompting signals received on said speaker of said telephone station, for changing a state of said authentication means.

3. The authentication means of claim 2 wherein said control key is used for initiating transmission of said number.

4. The authentication means of claim 1 further comprising a key for disabling said authentication means.

5. The authentication means of claim 1 further comprising timing
   means for disabling said authentication device after a lapse of a predetermined interval following enablement or use of said authentication means.

6. The authentication means of claim 1 further comprising clock means for maintaining date and time;
   wherein said independently maintained quantity is date and time.

7. The authentication means of claim 1 further comprising:
   means for displaying said number;
   wherein, in noisy surroundings, said user is enabled to key said number into said telephone station, using a keypad of said station.

8. The authentication means of claim 1 further comprising:
   means for storing additional personal identification numbers; and
   means for storing additional data corresponding to said additional personal identification numbers;
   wherein said means for enabling is also responsive to a match of one of said additional personal identification numbers for enabling said authentication means; and
   wherein said means for generating is further responsive to said additional data if said user keys one of said additional personal identification numbers.

* * * * *